June 5, 1962
D. J. GRANT
3,037,376
METHOD OF LOCATING THE CENTER OF GRAVITY
OF A MISSILE SECTION
Filed Oct. 29, 1959
5 Sheets-Sheet 1
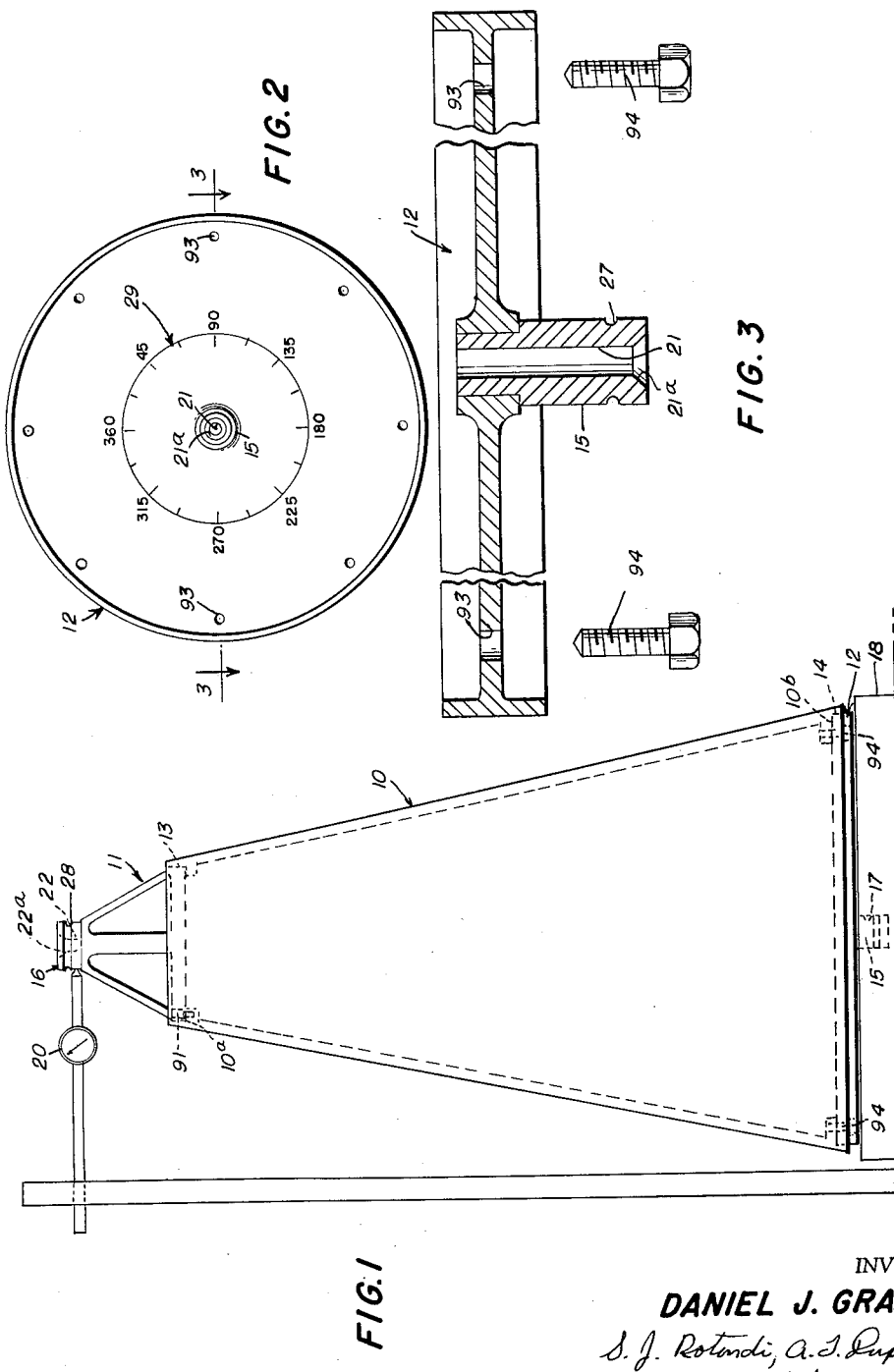
INVENTOR
DANIEL J. GRANT

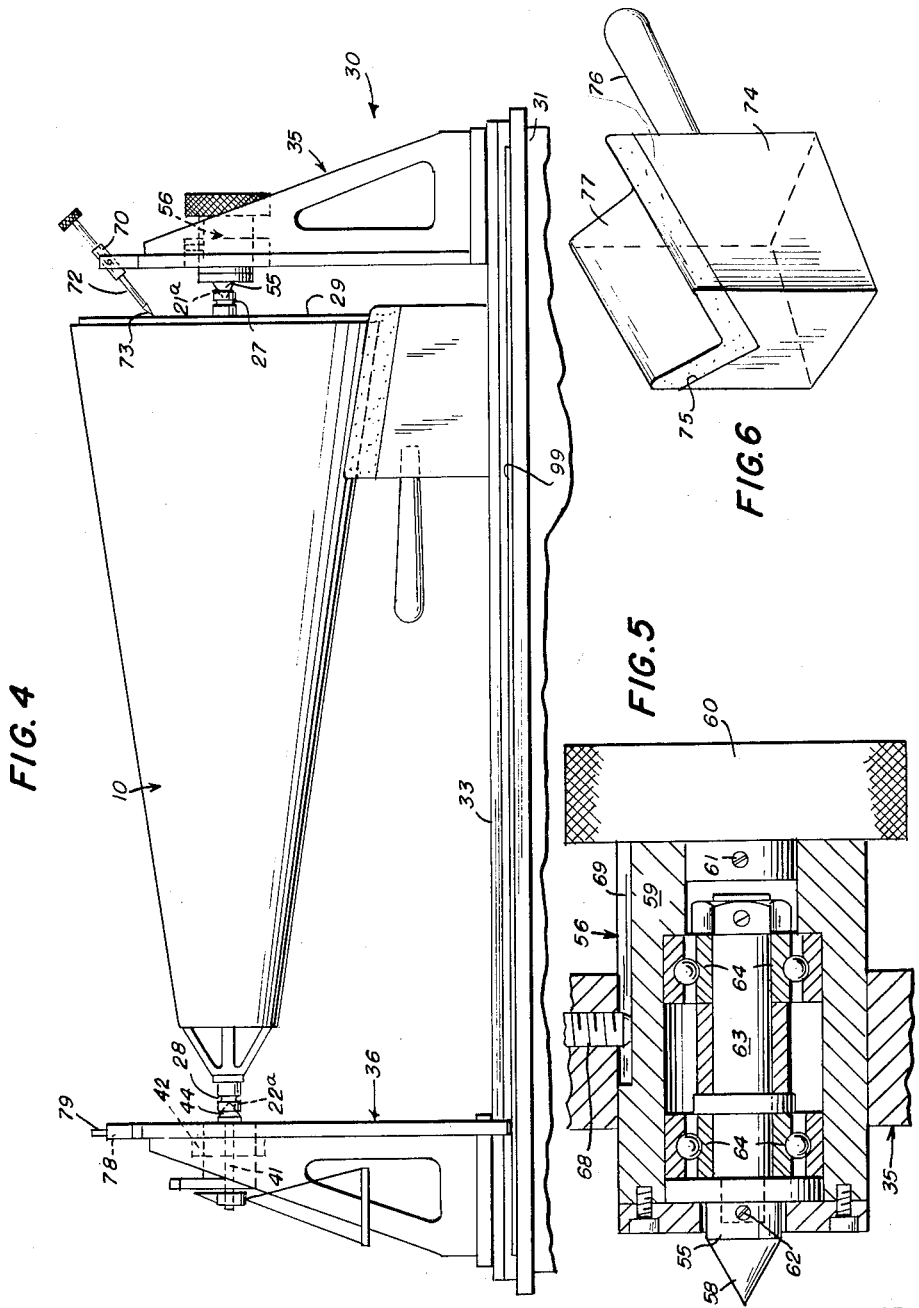

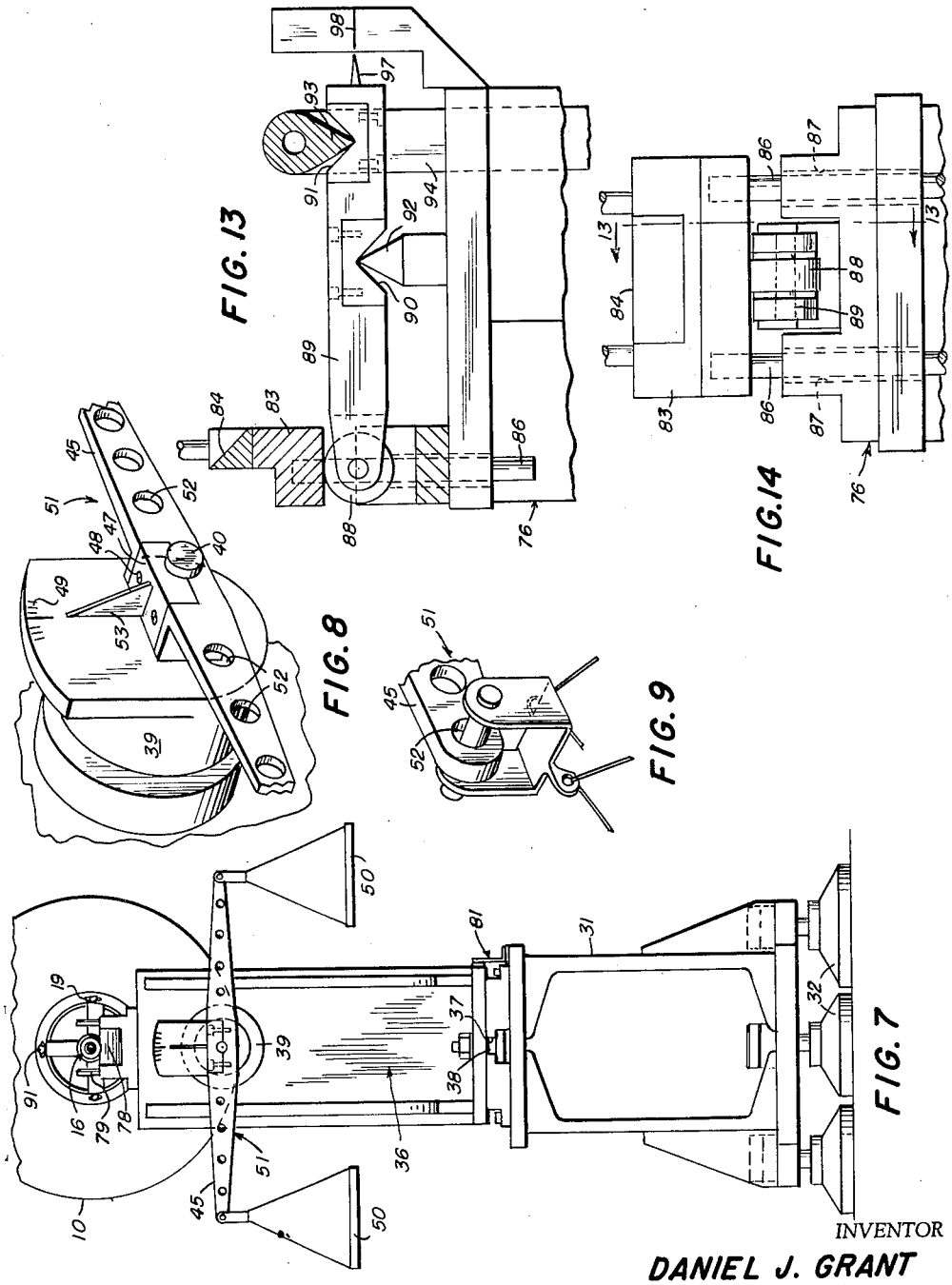

INVENTOR
DANIEL J. GRANT

June 5, 1962

D. J. GRANT 3,037,376

METHOD OF LOCATING THE CENTER OF GRAVITY
OF A MISSILE SECTION

Filed Oct. 29, 1959

INVENTOR
DANIEL J. GRANT

BY

United States Patent Office 3,037,376
Patented June 5, 1962

3,037,376
METHOD OF LOCATING THE CENTER OF GRAVITY OF A MISSILE SECTION
Daniel J. Grant, Chevy Chase, Md., assignor to the United States of America as represented by the Secretary of the Army
Filed Oct. 29, 1959, Ser. No. 849,696
3 Claims. (Cl. 73—65)
(Granted under Title 35, U.S. Code (1952), sec. 266)

The invention described herein may be manufactured and used by or for the Government for governmental purposes without the payment to me of any royalty thereon.

This invention relates to a method and a machine for accomplishing the method of determining the location of the center of gravity of one section with respect to an adjoining section prior to the assembly of the sections.

More specifically, this invention provides a method and a machine for accomplishing the method of accurately ascertaining the location of the center of gravity of a missile section with respect to the common axis of a pair of concentric end sections or the center of a selected circular mating surface.

In assembling the various sections that comprise the missile, it is important to determine if the missile is properly balanced about its longitudinal axis and whether the missile center of gravity is properly located with respect to the center of pressure. The various missile sections, such as the nose cone, which form the assembled missile have centers of gravity which may be located in different planes with respect to each other. In determining whether or not the missile is balanced about its longitudinal axis, some means had to be provided which would accurately determine the location of the center of gravity of each section with respect to a reference line or axis. Thus the location of the resultant center of gravity of the assembled missile could be ascertained by a summation of the moments of the individual centers of gravity.

Known prior art devices either determine the position of the center of gravity with respect to a peripheral or outer surface of the section or require the use of complex vector diagrams before the location determination can be made as to each section. The disadvantage of using the external surfaces of the section as a reference is that these surfaces are usually cast and may be skewed relative to the desired reference axis. Measurements made with reference to these surfaces are generally quite inaccurate. Also these external surfaces may not be accurately referenced to surfaces which mate with adjoining sections. Other known devices and methods which determine the center of gravity of an object or section require the plotting of vector loci in order to determine the position of the resultant center of gravity of the section. Such plotting systems and methods are necessarily less accurate than a system which will directly indicate the roll and longitudinal moments and therefore position of the center of gravity of a section.

Therefore, it is an object of this invention to provide a device which will directly and accurately determine the location of the center of gravity of a section with respect to a preferred reference axis and without regard to the shape of the section.

According to the method of this invention, the particular missile section, the center of gravity of which is to be determined, is provided with two adapter plates. Each adapter plate is placed on opposite ends of the section. The first adapter fits into the accurately machined end of the particular section in a manner similar to that in which a mating section would fit. The other adapter is concentrically aligned with respect to the first adapter. The package consisting of the section and adapters is thereafter placed in the machine of this invention which is capable of indicating accurately and directly the location of the center of gravity of the section with respect to the centerline between the end seats or surfaces which are formed in the opposite ends of the section. When the missile sections are assembled, the center of gravity of each section with respect to the adjoining mating section is known. Thereafter a simple moment summation can determine the resultant center of gravity of the missile.

FIG. 1 illustrates a device for initially aligning the adapters in the missile section.

FIG. 2 is an end view of one of the adapters.

FIG. 3 is a sectional side view of the adapter shown in FIG. 2, the section being taken through section lines 3—3.

FIG. 4 illustrates the machine for determining the magnitude of the moment produced by an eccentric center of gravity.

FIG. 5 shows means for providing finer adjustment in pressure between the pivots and the adapters which rotate therewith.

FIG. 6 shows a block which is used for preventing rotation of the missile section when it is placed in the machine shown in FIG. 4.

FIG. 7 is an end view of the machine shown in FIG. 4, as viewed from the left side.

FIG. 8 is a perspective view of a housing and an arm which cooperates therewith to ascertain the magnitude of the eccentric or roll moment in the missile section.

FIG. 9 shows in detail the frictionless connection between the arm shown in FIG. 7 and two pans which are suspended from the ends of the arm.

FIG. 13 is a partial side sectional view taken through section lines 13—13 in FIG. 14.

FIG. 14 is an end view of FIG. 13.

FIG. 1 shows a tapered missile section 10 which may be a portion of the nose cone or any other section which forms the missile. For purposes of illustration, numeral 10 will be hereafter referred to as a cone although it should be understood that any missile section can be handled in the machine of this invention.

Two adapters, 11 and 12, are positioned at the opposite ends of nose cone 10. The circular end sections or seats 10a and 10b (FIGS. 1 and 12) of the nose cone 10 have two accurately machined bores 13 and 14 which have concentric centers. Bores 13 and 14 are cut as concentrically as possible when the cone 10 is formed. These bores mate with the outwardly extending circular flanges of adjoining sections. Seat 10a can mate with another section, for example, a cone-shaped fuze section (not shown), while seat 10b is designed to mate with a larger circular section of the missile (not shown). It is with respect to the perpendicular centerline of seats 10a and/or 10b that the location of the center of gravity of cone 10 is determined so that the center of gravity of the cone 10 with respect to the section to which cone 10 is attached will be known. Thus when the various sections are assembled the center of gravity of each section with respect to its adjoining section will be known.

Figure 12:
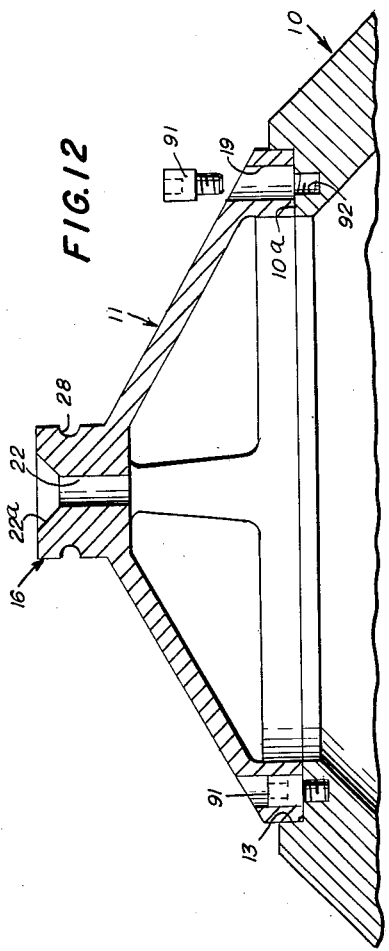
FIG. 12 is a sectional side view of the other adapter plate seated in one end of the missile section.

The two adapters, 11 and 12, are designed to fit on seats 10a and 10b, respectively. Adapter 12 is designed to fit tightly in bore 14. Adapter 11 does not fit as tightly in bore 13 so that very slight lateral movement of adapter 11 in bore 13 is possible. Bolts 91 (FIGS. 1, 7 and 12)

pass through oversized bores 19 and threadedly engage threaded holes 92 (FIG. 14) in end seat 10a. Bores 19 are elongated so that adapter 11 can be displaced slightly with respect to end seat 10a before the bolts 91 are tightened. When the bolts 91 are tightened in oversized bores 19, adapter 11 will be firmly seated in seat 10a (FIG. 12). Similarly, adapter 12 (FIG. 3) is provided with bores 93 through which bolts 94 can pass and thereby force adapter 12 against seat 10b. However the bores 93 in adapter 12 are not oversized and hence no movement is possible between adapter 12 and end seat 10b when bolts 94 are tightened.

The exact shape of adapter 11 and 12 will, of course, depend upon the shape of seats 10a and 10b. If seats 10a and 10b have protruding flanges the adapters would be designed with grooves to mate with the outer machined periphery of these flanges.

The first step of ascertaining the center of gravity of cone 10 with respect to seats 10a and 10b, consists of tightly inserting adapter 12 into bore 14, as shown. Concentric hub 15 of adapter 12 is designed to fit tightly in accurately machined bore 17, formed in the center of the circular rotatable table 18. Adapter 12 is tightly fixed in seat 10b by bolts 94. Adapter 11 is also provided with a concentric hub 16. Table 18, which is rotatable in the horizontal plane as viewed in FIG. 1, cooperates with a dial gage 20 so that the periphery of hub 15 and the periphery of hub 16 can be concentrically aligned. Bores 21 and 22 in adapter hubs 15 and 16 are concentric with the periphery of hubs 15 and 16 so that bores 21 and 22 also can be aligned concentrically with respect to each other.

The exact alignment of bores 21 and 22 is accomplished by dial gage 20 contacting the periphery of hub 16 and upon rotation of table 18 any eccentricity between the peripheries of hubs 15 and 16 can be eliminated by moving adapter 11 in bore 13. Table 18 and dial gage 20 provide conventional means to determine eccentricity between two members. Generally, if bores 13 and 14 have been accurately machined very little or no movement of adapter 11 is necessary. The small amount of error introduced by movement of adapter 11 relative to bore 13 is further reduced because as will be evident to those skilled in the art, this error is spread over the distance between the adapter 11 and the center of gravity of cone 10. When the dial gage 20 does not move after table 18 is rotated, the peripheries of hubs 15 and 16 are concentrically aligned. Bolts 91 are then tightened fixing adapter 11 in seat 10a.

As shown in FIGS. 1 and 3, hubs 15 and 16 are provided with peripheral grooves 27 and 28. Bores 21 and 22 are beveled to form cone-shaped surfaces 21a and 22a, respectively (FIGS. 2 and 12). Adapter 12 (FIG. 2) is provided with a protractor 29 which is fixed to the face of the adapter as shown.

The next step necessary to determine the location of the center of gravity of cone 10 with respect to seats 10a and 10b is to take the package comprising cone 10 and adapters 11 and 12 from table 18. The package so formed is turned to the horizontal position and placed in machine 30.

Figure 10:
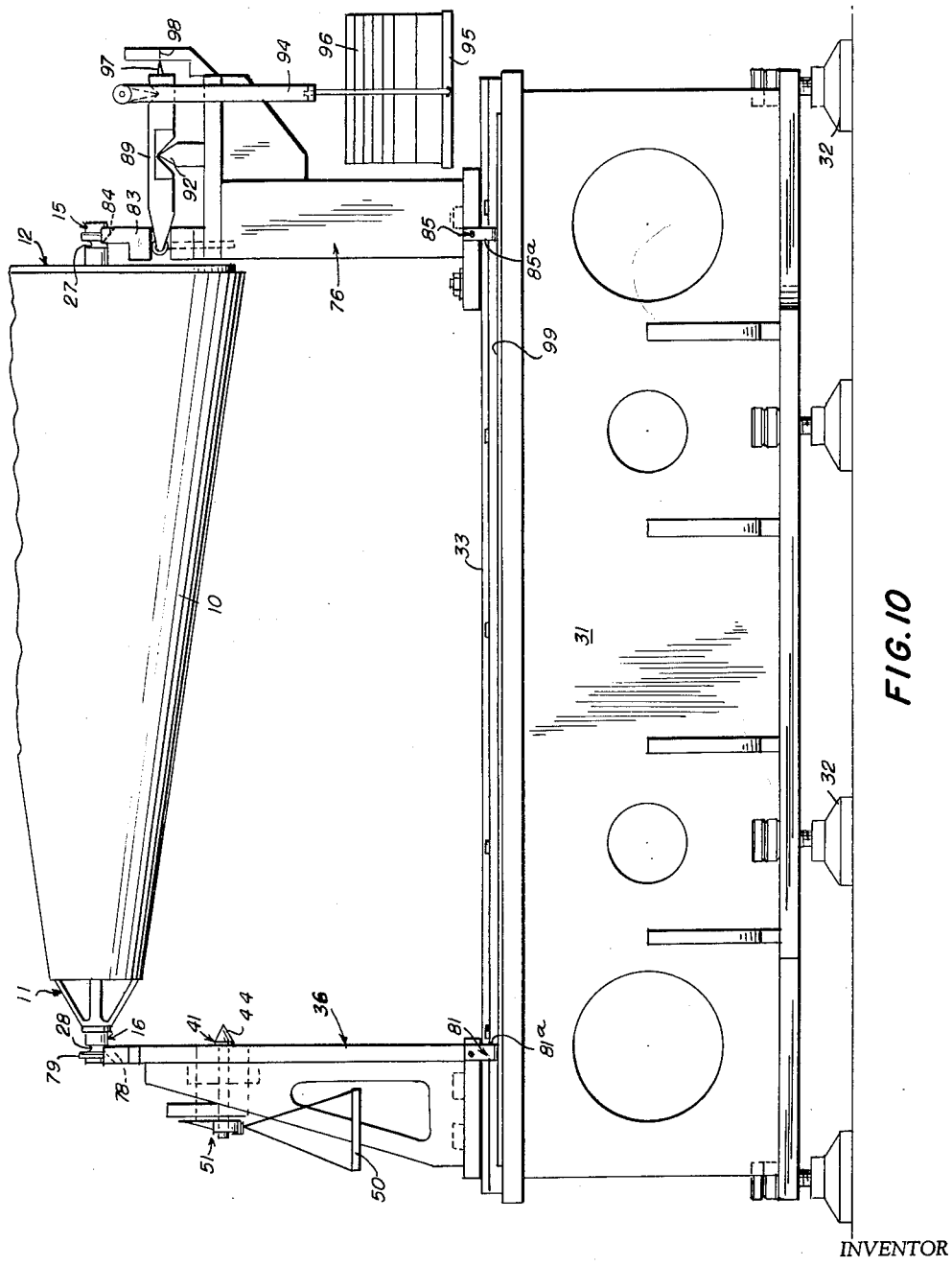
FIG. 10 is a side elevation of the machine shown in FIG. 4 which has been modified by the addition of another support so that the longitudinal position of the center of gravity of the section along the perpendicular bisector of any selected mating surface can be determined.
Figure 11:
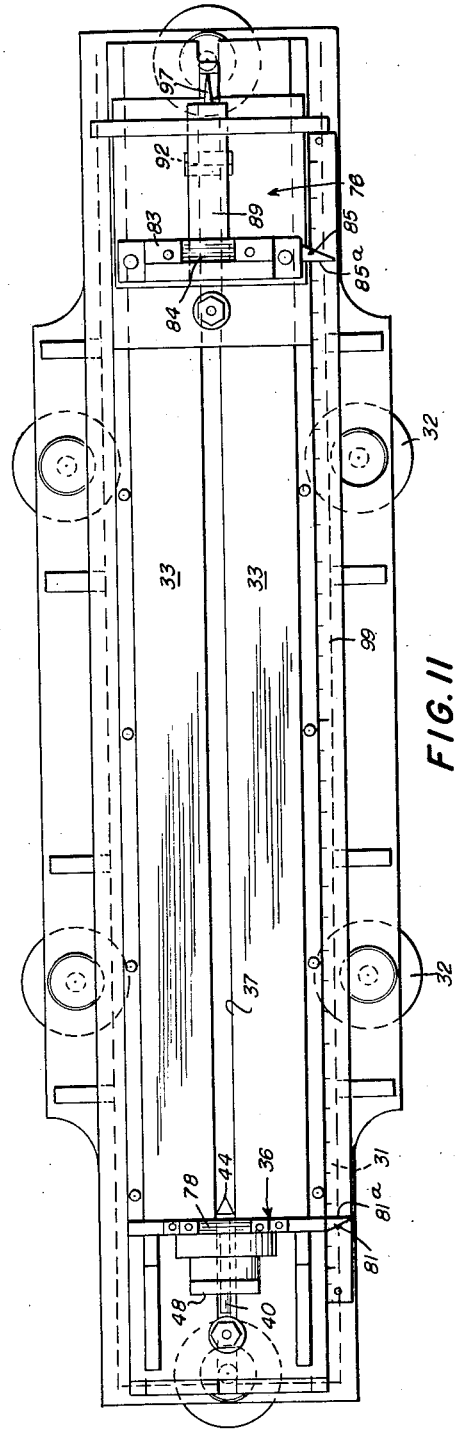
FIG. 11 is a plan view of the machine shown in FIG. 10, with the missile section removed therefrom.

FIG. 4 shows the upper half of machine 30, while FIG. 10 shows the lower half. As shown in FIGS. 4 and 10, machine 30 consists of a composite channel member 31 which is supported by six adjustable legs designated by numeral 32 (FIG. 11).

Legs 32 permit horizontal alignment of the channel member 31 as viewed in FIGS. 4 and 10. Firmly attached to channel member 31 is a grooved bed 33 (FIG. 7). Bed 33 is grooved at 37 (FIG. 11) so that vertical supports 35 and 36 are accurately guided for sliding movement upon bed 33. Support 35 can be fixedly secured to bed 33 by means of take-up nut 38.

Housing 39 (FIGS. 7 and 8) in support 36 houses a pivot 41 (FIG. 4) which is mounted for free rotation in support 36 by roller bearings 42. The beveled end 44 of pivot 41 is designed to mate with surface 22a of adapter 11. The engagement between the beveled end 44 of pivot 41 and the surface 22a of adapter 11 is frictional or positively connected by a suitable means so that any rotative movement of cone 10 causes rotative movement of pivot 41.

The end 40 of pivot 41 extends from housing 39 (FIG. 8). Arm 45 can be fixedly mounted to end 40 by means of block 47 when screws 48 are tightened. The ends of arm 45 are provided with two identical pans 50 suspended by the substantially frictionless connection 51 shown in FIG. 9. A series of holes 52 are spaced from each other at one inch intervals. Bearing 47 also carries a vertical tab indicator 53 which will indicate on scale 49 the amount of rotation of pivot 41 and arm 45 when arm 45 is fixed to pivot 41 by means of block 47.

Engaging adapter 12 of cone 10 is pivot 55 (FIG. 4) which is rotatably mounted in housing 56. Housing 56 is mounted for longitudinal sliding movement in vertical support 35. The details of the housing construction and pivot 55 are shown in FIG. 5.

Housing 56 (FIG. 5) consists of a cylinder 59 and knob 60. Knob 60 is fixed in cylinder 59 by means of pin 61 and facilitates manual movement of cylinder 59 longitudinally as shown by the arrows. Pivot 55 is connected by means of pin 62 to rod 63 so that pivot 41 is capable of rotating with rod 63, the latter rotating in bearings 64. Pivot 55 is beveled at its end 58. Rotation of housing 56 is prevented by setscrew 68. Setscrew 68 entering slot 69 permits only longitudinal movement of cylinder 59 and housing 56 and when tightened until it engages the bottom of slot 69 locks housing 56 against longitudinal movement.

Hollow sleeve 70 (FIG. 4) is mounted for pivotal movement in a vertical plane about the top of support 35. Stylus or indicator rod 72 is freely slidable and rotatable in sleeve 70 and end 73 can contact the periphery of the protractor 29 (FIG. 2) on the face of adapter 12. Block 74 is formed with an inclined V-shaped slot 75. Handle 76 extends from block 74 to facilitate the insertion of the block between the bed 33 and the outer surface of cone 10. A rubber covering 77 is cemented to slot 75 in order to increase the coefficient of friction between block 74 and cone 10.

Machine 30 determines the magnitude of the moment produced by eccentricity in the center of gravity of cone 10 with respect to seats 10a and/or 10b. Cone 10 is placed horizontally in machine 30 (FIG. 4) so that beveled surface 22a rides upon beveled surface 44. Setscrew 68 is tightened preventing movement of cylinder 59 and pivot 55 relative to support 36. Arm 45 is removed from end 40 by unscrewing screws 38. Support 36 is then free to slide along bed 33 until pivot 55 is inserted in bore 22. Beveled surface 21a rides upon beveled surface 58.

Finer adjustment between pivots 41 and 55 and surfaces 22a and 21a, respectively, can be accomplished by unloosening setscrew 68. Knob 60 can then either be manually moved so that pivot 55 exerts a more accurately determinable pressure against surface 21a or a conventional pressure gage or force dynamometer (not shown) can be pressed against knob 60 so that pivot 55 exerts a predetermined pressure against surface 21a. After this final adjustment has been made, setscrew 68 should be tightened so as to retain the setting.

Since cone 10 is mounted for rotative movement upon pivots 41 and 55, any eccentricity in the position of the center of gravity with respect to these pivots will cause cone 10 to rotate until the center of gravity is vertically aligned with respect to the centerline of the pivots 41 and 55. Stylus 72 can then be dropped into sleeve 70 so that end 73 will point to a number on protractor 29. Cone 10 is thereafter rotated ninety degrees in either direction from this number. The ninety degree angle of rotation can easily be determined by subtracting or adding ninety degrees from or to the number to which end 73 pointed to on protractor 29. The effect of the lever arm through which the center of gravity acts is maximized when the cone is rotated ninety degrees in either direction and the error in making determination as to the magnitude of the moment produced by the eccentric center of gravity is minimized.

Block 74 is inserted between cone 10 and bed 33, as shown in FIG. 4, to retain cone 10 in the rotated position. Arm 45, carrying pans 50, is placed on pivot end 40 in a horizontal position and is firmly affixed thereto by tightening screws 48. Block 74 is then removed. By adding weights (not shown) to pans 50 sufficient to maintain arm 45 horizontal after block 74 is removed, the direction and magnitude of any eccentricity in the center of gravity can be determined easily because the amount of weight in each pan is known and the distance between the pans and the center of pivot 41 is also known. Since pivots 41 and 55 are concentric with seats 10a and 10b, a rapid determination can be made as to the position and magnitude of the moment produced by the eccentric center of gravity relative to the centerline of pivots 41 and 55 and seats 10a and/or 10b, respectively.

While the above described arrangement of machine 30 determines the magnitude of roll moment and the position of the center of gravity relative to the centerline of the end plates of roll moment, it does not determine the precise longitudinal location of the center of gravity with respect to the line which is perpendicular to the center of the selected reference mating surface of cone 10. In order to make this determination another vertical support 76 replaces support 35 on bed 33, as shown in FIGS. 10 and 11. Support 35 can be removed from bed 33 by merely unscrewing a take-up nut (not shown), and sliding support 36 off the end of bed 33. Support 76 can thereafter be slid onto bed 33 and firmly fastened thereto by a take-up nut (not shown). The take-up nuts are conventionel, one such nut being shown at 38 (FIG. 7).

Support 36 is also provided with knife edge 78 and two vertical projecting rods 79 (FIGS. 4 and 10) which prevents adapter 11 from sliding off the end of knife edge 78. Knife edge 78 is designed to fit into groove 28 and thereby insures accurate positioning of adapter 11 with respect to the knife. Indicator tab 81 affixed to the lower edge of support 35 has a straight edge 81a which is vertically aligned with the end of knife edge 78. Support 76 is also provided with a knife edge 83 and two vertically projecting rods 84 for preventing adapter 12 from sliding off the end of knife edge 83. Knife edge 78 fits in groove 27 in adapter 12. Indicator tab 85 has an edge 85a which is vertically aligned with knife 83. Rule 99 is affixed to bed 33 so that the distance between edges 81a and 85a can be ascertained.

While knife edge 78 is fixed to support 35, knife edge 83 is designed to move in a vertical plane. Vertical sliding movement of knife 83 is provided by vertical rods 86 (FIG. 14) which are guided in vertical sliding movement by bores 87 in support 76. Roller 88 is rotatably mounted on the end of lever 89 (FIG. 13) and causes movement of lever 89 when knife edge 83 is moved in the vertical plane. Two V-shaped slots, 90 and 91, are formed in lever 89 and engage knife edges 92 and 93, as shown. As will be evident to those in the art, the lever connection between knife edge 83 and rod 94, provides a virtually frictionless connection between these movable members. Rod 94 supports pan 95 (FIG. 10) which in turn carries weights 96. Indicator 97 fixed to the end of lever 89 cooperates with horizontal line 98 so that one can determine when the lever 89 is horizontal. When there are no weights 96 on pan 95 and when there is no weight on knife edge 83, lever 89 will be horizontal and indicator 97 will point to line 98 (FIG. 13).

When cone 10 is positioned as shown in FIG. 10, weights 96 must be added to pan 95 in order to keep lever 89 horizontal. The amount of weight which is required to keep lever 89 horizontal can of course be easily determined by summing up the individual weights 96 applied to pan 95. Edges 81a and 85a of indicator tabs 81 and 85 will indicate on rule 99 the exact distance between knife 78 and knife 83. Since the weight of cone 10 can be accurately determined and since grooves 27 and 28 are equally spaced from seats 10a and 10b, those in the art can also easily determine the longitudinal position of the center of gravity with respect to the perpendicular bisector of the selected reference mating surface of cone 10.

It will be apparent that the embodiments shown are only exemplary and that various modifications can be made in construction and arrangement within the scope of the invention as defined in the appended claims.

I claim as my invention:

1. A method for determining the magnitude of the moment produced by an eccentric center of gravity in an elongated section with respect to the perpendicular bisector of one end surface of a pair of spaced-apart end surfaces, comprising: placing first and second balanced adapters on each end surface, said first adapter being concentrically secured against said one end surface, aligning said second adapter against the other end surface such that said adapters are substantially concentric with respect to each other, fixing each adapter in each end section while said adapters are concentric, concentrically suspending said adapters so that said section rotates to a first position as a result of eccentricity in the center of gravity, rotating said section ninety degrees from said first position, balancing the section in the rotated position so that the magnitude of the moment of the center of gravity can be accurately determined with respect to the perpendicular bisector of said one end surface.

2. A method for determining the magnitude of the moment produced by an eccentric center of gravity in an elongated section with respect to the perpendicular bisector of one end surface of a pair of spaced-apart end surfaces, comprising: placing first and second balanced adapters against each end surface, said first adapter being concentrically fixed with respect to the one end surface, aligning said second adapter on the other end surface such that said adapters are concentric with respect to each other, fixing said second adapter on said other end surface in concentric relationship to said first adapter, suspending said adapters so that said section rotates to a first position as a result of eccentricity in the center of gravity, rotating said section ninety degrees from said first position, balancing the section in the rotated position by means of weights so that the magnitude of the moment produced by the eccentric center of gravity can be accurately determined with respect to said one end surface, measuring the distance between the end surfaces of said section, and thereafter weighing said one end of said section while the other end is supported so that the position of said moment with respect to the perpendicular bisector of said one end surface can be determined.

3. A method for determining the magnitude of the moment produced by an eccentric center of gravity in an elongated section with respect to the perpendicular bisector of one circular end surface forming one surface of a pair of circular spaced-apart end surfaces, comprising: fixing a first adapter against one end surface concentrically thereof, aligning a second adapter on the other end surface such that the centers of said adapters are concentric, fixing said second adapter against said other end surface in concentric relationship to said first adapter, suspending said adapters concentrically thereof so that said section rotates to a first position as a result of eccentricity in the center of gravity, rotating said section ninety degrees from said first position, balancing the section in the rotated position by means of weights so that the magnitude of the moment produced by an eccentric center of gravity can be accurately determined with respect to said perpendicular bisector of said one end surface, measuring the distance between said end surfaces of said section, and thereafter weighing said one end of said section while the other end is supported so that the position of said moment with respect to said one end surface can be determined.

References Cited in the file of this patent

UNITED STATES PATENTS

| | | |
|---|---|---|
| 1,428,620 | Wilber | Sept. 12, 1922 |
| 2,425,685 | Pinder et al. | Aug. 12, 1947 |
| 2,463,102 | Gruetjen | Mar. 1, 1949 |
| 2,693,695 | Jacobsen et al. | Nov. 9, 1954 |

FOREIGN PATENTS

| | | |
|---|---|---|
| 3,989 | Great Britain | Feb. 16, 1914 |